No. 683,376. Patented Sept. 24, 1901.
J. J. BREACH.
MACHINE FOR CUTTING ARTICLES FROM SHEET MATERIAL.
(Application filed Sept. 21, 1900.)
(No Model.) 2 Sheets—Sheet 1.
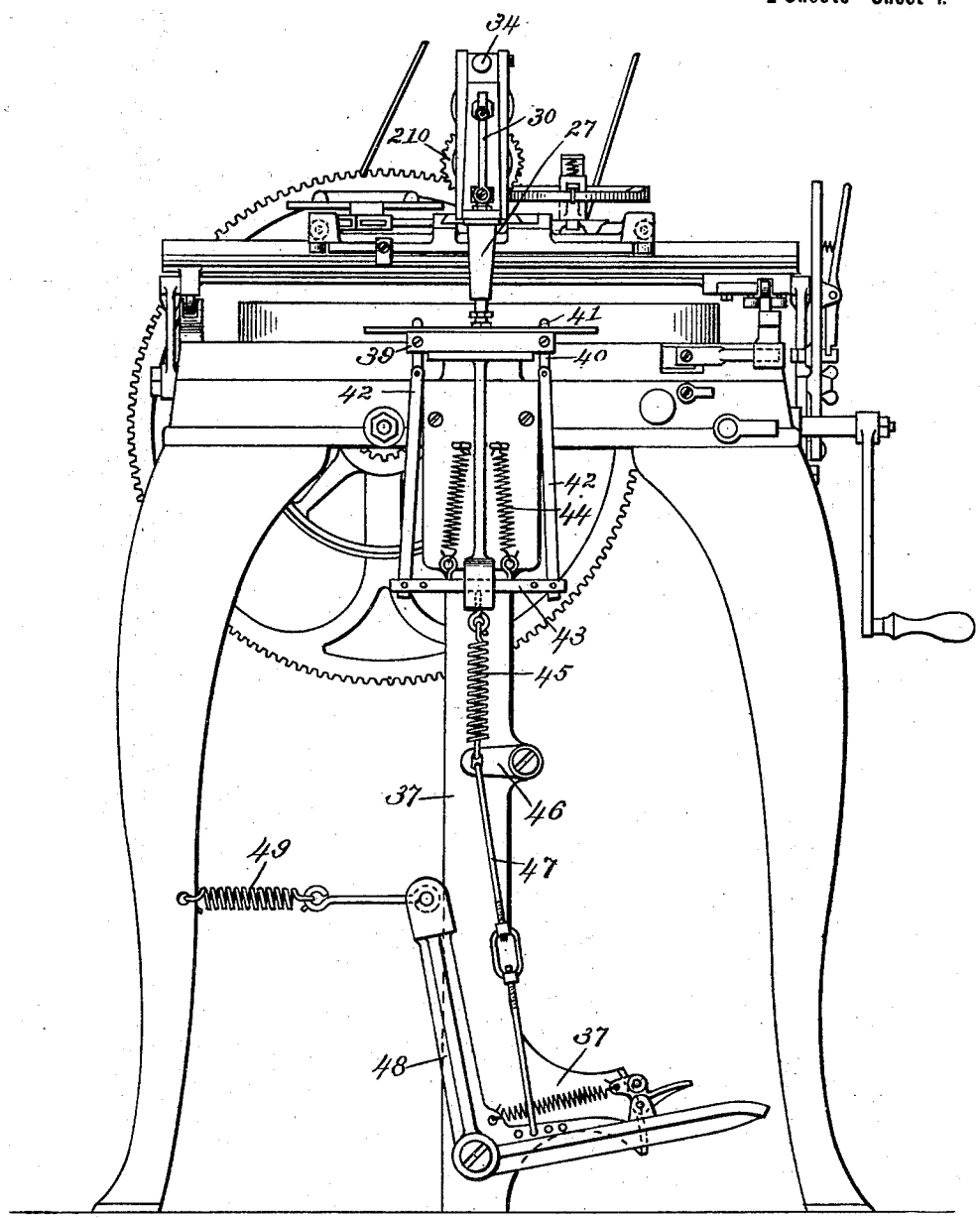
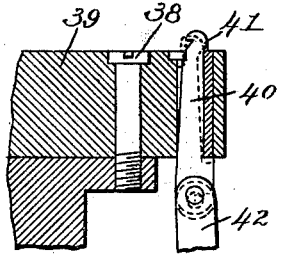
Fig. 1.
Fig. 2.
WITNESSES
Fred O. Fish
Horace Van Everen
INVENTOR
James J. Breach
by his Attorney
Benjamin Phillips
THE NORRIS PETERS CO., PHOTO-LITHO., WASHINGTON, D. C.

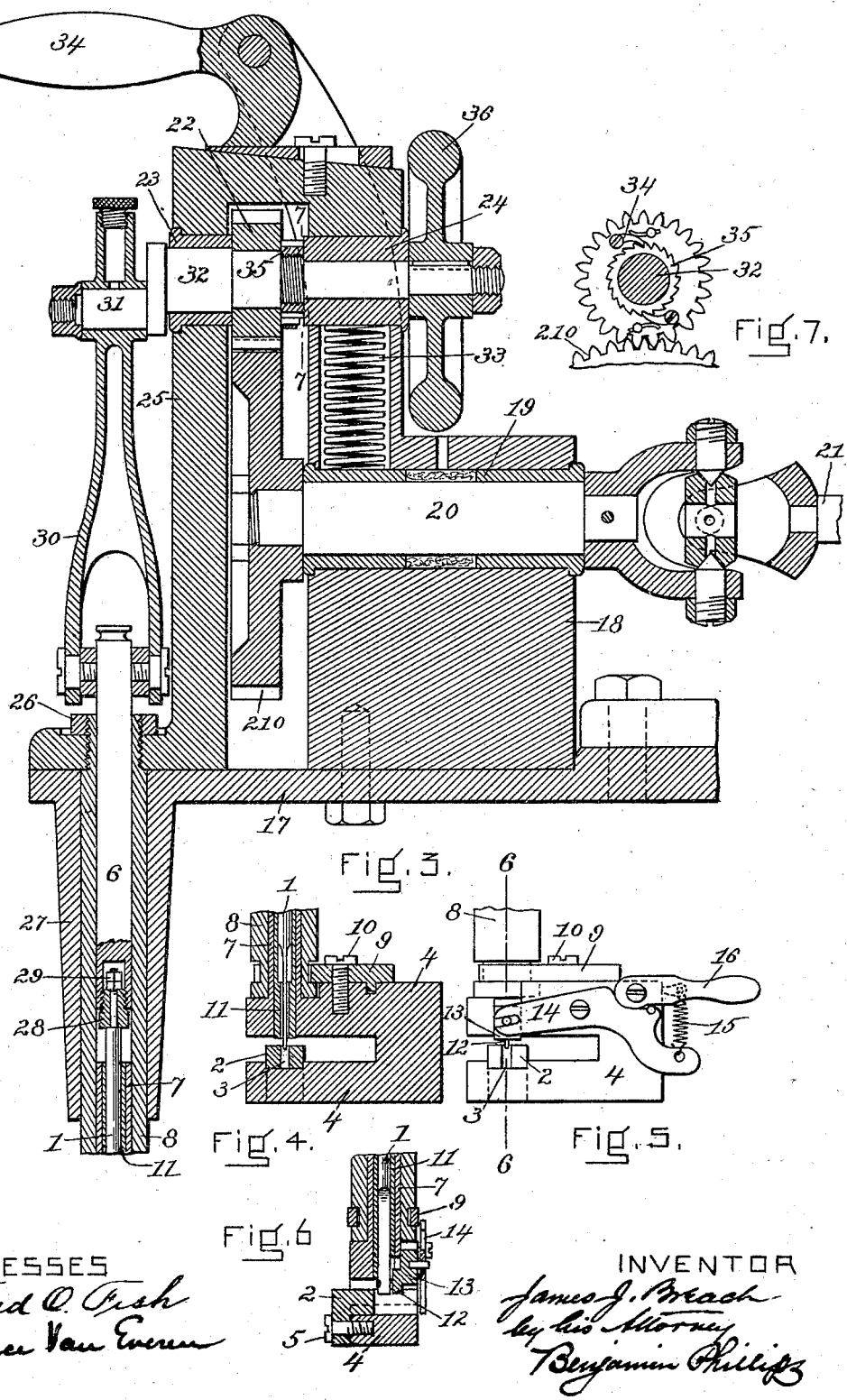

UNITED STATES PATENT OFFICE.

JAMES J. BREACH, OF BOSTON, MASSACHUSETTS.

MACHINE FOR CUTTING ARTICLES FROM SHEET MATERIAL.

SPECIFICATION forming part of Letters Patent No. 683,376, dated September 24, 1901.

Application filed September 21, 1900. Serial No. 30,643. (No model.)

*To all whom it may concern:*

Be it known that I, JAMES J. BREACH, a citizen of the United States, residing at Boston, in the county of Suffolk and State of Massachusetts, have invented certain new and useful Improvements in Machines for Cutting Articles from Sheet Material; and I do hereby declare the following to be a full, clear, and exact description of the invention, such as will enable others skilled in the art to which it appertains to make and use the same.

This invention relates to a machine for cutting articles from sheet material, and more particularly to a machine for cutting patterns from sheet metal for use in the manufacture of boots and shoes.

A machine for cutting patterns for use in the manufacture of boots and shoes to be commercially practical must have the cutting mechanism so arranged as to be capable of cutting out patterns of widely-differing size and shape, and no machine for cutting patterns from sheet metal has heretofore been devised, so far as I am aware of the state of the art, which fulfils this requirement. Various forms of grading-machines for cutting out articles of irregular outline have been devised; but none of these machines have been capable of cutting a smooth-edge pattern from sheet metal. I am aware that a grading-machine of the pantographic type has heretofore been devised that is capable of cutting articles from sheet metal; but in such machine a punch circular in cross-section has been employed, and the edge of the article produced has consequently been serrated, involving a subsequent operation for smoothing off or covering up such edge. Moreover, such machine is intended more especially for use in cutting patterns from sheets of cardboard, the patterns being afterward edged with metal, and is not adapted for practical use in cutting patterns from sheet metal on account of the subsequent operation necessary to smooth the edge. In the manufacture of sheet-metal patterns it has therefore been the practice heretofore to trace the outline of the pattern on a sheet of metal by means of a grading-machine or otherwise and then to cut out the pattern by means of a pair of shears.

The object of my invention is, then, to provide a machine capable of cutting from a sheet of metal a pattern of any desired outline—such, for instance, as a pattern of a boot or shoe sole—which shall have a smooth edge and which shall require no subsequent treatment to adapt it for use. By my invention I am enabled to provide a machine for doing this work, thereby doing away with the laborious hand method and at the same time producing a more perfect article.

In carrying out my invention I provide a reciprocating punch having a substantially straight cutting edge and a die coöperating therewith to support the material against the cut of the punch, whereby a clean cut is produced, and so mount the punch and die that they can be moved to bring the cutting edge of the punch in line with the cut which it is desired to make. By this means articles of irregular or curvilinear outline can be cut out the edges of which are smooth and which require no subsequent operation to render them suitable for use.

I am aware that machines for cutting cloth have been devised which comprise a reciprocating knife and a die movably supported to allow the cutting edge of the knife to be brought in line with the outline of the article to be cut out. Such machines are, however, incapable of performing the work for which a machine embodying my invention is intended and also differ, essentially, therefrom in certain features of construction, among which may be noted the thin standard from which the foot-plate carrying the die is supported, which is situated in the line of cut and passes through the material back of the knife. As distinguished from this construction the means for movably supporting the punch and die of a machine embodying my invention are located outside of the line of cut—that is, no portion of the supporting means extends into a position to enter the cut made in the material by the punch—whereby the machine is made capable of operating upon sheet metal of the thickness used in the manufacture of patterns.

The punch which I prefer to use is a punching-cutter rectangular in cross-section, by which pieces of the material are bodily removed and a slot formed in the material during the cutting of the pattern. My invention, broadly considered, however, contemplates the use of any suitable form of punch provided with at least one substantially straight cutting edge for forming the cut at the edge of the pattern, and, if desired, this cutting edge may be the only one provided, the punch being merely a straight-edged knife. I also preferably provide means for automatically moving the punch and die to bring the cutting edge of the punch in line with the cut which it is desired to make, the preferred form of such means being a guiding projection or lug entering the slot in the material behind the punch and acting to guide the punch and die and hold them in the desired position.

The cutting mechanism above referred to may be applied to machines of widely-differing construction and mode of operation; but I prefer to apply it to a grading-machine of the pantographic type, and in the drawings accompanying this application I have shown it applied to a machine similar in many respects to the machine disclosed in my Patent No. 318,539, dated May 26, 1885. To adapt the machine disclosed in said patent for cutting patterns from sheet metal, I have made certain changes therein; and my invention accordingly consists, in addition to the cutting mechanism above referred to, of certain devices and combinations of devices hereinafter described and claimed.

Referring to the drawings, in which is illustrated a preferred form of my invention, Figure 1 is a view in front elevation of a machine similar to the machine disclosed in the patent above referred to with my invention applied thereto. Fig. 2 is a detail sectional view of a portion of the work-support and one of the clamping members for holding a sheet of material placed thereon. Fig. 3 is a sectional elevation of the punch-carrying slide and the operating mechanism carried thereby. Fig. 4 is a sectional view of the die and lower end of the punch and associated parts, such figure being a continuation of Fig. 3. Fig. 5 is a view in side elevation of the parts shown in Fig. 4. Fig. 6 is a sectional view on the line 6 6, Fig. 5; and Fig. 7 is a detail sectional view on the line 7 7, Fig. 3.

Referring to the drawings, in which like characters of reference indicate like parts, 1 indicates a reciprocating punch, herein shown as a cylindrical rod having its lower portion formed into a punch rectangular in cross-section, and 2 a die for supporting the material against the cut of the punch, provided with a die-opening 3 for receiving the punched-out portions of the material. The die 2 consists of an L-shaped block secured to a block 4 by means of the screws 5 and seated in a slot therein. The punch 1 and die 2 are so mounted that they can be moved to bring the cutting edge of the punch in line with the cut which it is desired to make, the means for so mounting the punch and die being located outside of the line of cut. In the construction shown in the drawings for allowing this movement the punch 1 is swivelingly connected to its actuating-rod 6, as will be described, and the die 2 is pivotally mounted concentrically with the swiveling axis of the punch. For so mounting the die 2 the block 4 is provided with a tubular extension 7, extending upwardly into a tubular guide 8, axially of which the punch 1 is arranged to reciprocate. A plate 9, secured to the top of the block 4 by means of the screw 10 and provided with a recess loosely engaging a groove in the lower end of the tubular guide 8, supports the block on the guide and allows it to swing about the axis of the punch. For causing the punch to swing with the die a guide 11 is provided, secured to the block 4, said guide consisting of a hollow rod firmly seated in the block 4 and its tubular extension 7. The upper portion of the guide 11 is provided with a cylindrical bore to receive and guide the upper cylindrical portion of the punch, and the lower end of the guide is slotted to receive and guide the lower rectangular portion of the punch. The punch 1 and die 2 are in axial alinement, and the block 4 is pivotally supported concentrically with this axis, the result of the above-described construction being that the block 4 can be swung about its pivot, thereby rotating the die 2 and through the guide 11 the punch 1. The punch and die can thus be moved to bring the cutting edge of the punch into alinement with the cut which it is desired to make.

The lower end of the punch is preferably so formed that portions of the material are removed and a slot formed in the material by the action of the punch, and for moving the punch and die to cause the cutting edge of the punch to extend in the direction of the outline of the article being cut I provide a lug or projection 12 on the block 4, arranged to enter the slot behind the punch. This lug is carried by a block 13, (see Figs. 5 and 6,) arranged to slide in vertical guideways in the side of the block 4, the side of the punch-guide 11 being slotted, as shown in Fig. 6, to allow the lug to enter the slot immediately behind the punch. A lever 14, pivoted to the side of the block 4, having a pin-and-slot connection with the block 13 and acted upon by the spring 15, serves to force the lug 12 into the slot. For actuating the lever 14 against the tension of the spring 15 to raise the lug from the slot a cam-lever 16, pivoted to the side of the block 4 above the lever 14, is provided. The block 4 is provided with an opening or slot to receive the edge of the material from which the pattern is to be cut, the die 2 being situated below and the punch-guide 11 above this slot.

It will be noted that the means for supporting the punch 1, consisting of the actuating-rod 6, with which the punch has a swivel connection, and the means for supporting the die 2, consisting of the block 4, are located outside of the line of cut—that is, no portion of said means extends into a position to enter the cut made in the material by the punch.

In operation the edge of the material is inserted between the die and the punch-guide, the lever 16 turned to allow the lever 14 to press the lug 12 into contact with the material, and the punch 1 started to reciprocating. As the punch reciprocates the punch and material are moved relatively to each other to cause a pattern of the desired shape to be cut out. As soon as the slot cut in the material comes beneath the lug 12 the lug drops therein and controls the movement of the block 4, and consequently the axial movements of the punch and die. The lug 12 is at one side of the axis upon which the block 4 is pivoted, and as a consequence as the material and the punch are moved relatively to each other to bring the punch over the portion of the material to be cut the block 4 will be swung on its pivot by the engagement of the lug 12 with the slot in the material to cause the cutting edge of the punch to extend in the direction of the cut to be made. If, as in the construction illustrated, the punch is arranged to travel, the cutting edge of the punch will always extend in the direction of such travel. In the construction illustrated in the drawings the punch is caused to travel in a path corresponding to the article to be cut out and to be reciprocated by substantially the mechanism disclosed in the patent above referred to.

Referring to Fig. 3, 17 designates a carriage upon which the punch and its actuating mechanism are supported and to which movements are imparted, as in the machine of the patent above referred to, to cause the punch to travel in a path corresponding to the article which is to be cut. Secured to the carriage 17 is a block 18, having secured therein a journal-box 19, in which is journaled a shaft 20, actuated from a shaft 21 through the universal joint shown. Secured to the shaft 20 is a gear-wheel 210, meshing with a pinion 22 upon a short shaft journaled in journal-boxes 23 and 24, carried by a support 25. The support 25 rests upon the carriage 17 and has secured thereto the downwardly-extending tubular guide 8, hereinbefore referred to, the guide 8 being secured to the support 25 by being screwed through the bottom thereof and locked in position by means of the nut 26. A downwardly-extending tubular extension 27 of the carriage 17 forms a bearing for the guide 8. The rod 6 is arranged to reciprocate through the guide 8, and the punch 1 is swivelingly connected to the rod 6 by means of the reduced upper end of the punch passing through a block 28, screwed into the lower end of the rod 6, the punch being held in position by means of lock-nuts 29, engaging the reduced upper end of the punch above the block 28. For reciprocating the rod 6 a link 30 connects the upper end of the rod with the crank-pin 31 at the end of the shaft 32, journaled in the boxes 23 and 24. The suport 25 is movable vertically with relation to the carriage 17 to raise the block 4 above the work-support, to be hereinafter described, the support being guided in such movement by the guide-rod 8 and tubular extension 27 of the carriage 17. For so moving the support a spring 33 is provided, situated between the journal-boxes 19 and 24 and acting when the support 25 is released to raise the support and through the tubular guide 8 the block 4. A cam-lever 34, pivotally mounted on arms projecting from the block 18 above the support, serves to depress and hold the support against the tension of the spring 33. When the machine is stopped, it often happens that the punch 1 is in its lowest position, and it is therefore desirable to provide some means for raising the punch to allow the insertion of the material between the punch and the die without actuating the driving mechanism of the machine. To this end I mount the pinion 22 loosely upon the shaft 32 and connect the pinion with the shaft by means of spring-pressed pawls 34, pivoted to the face of the pinion and engaging the teeth of a ratchet 35, rigidly secured to the shaft. By this means the shaft 32 will be driven by the pinion, and at the same time the shaft can be turned ahead of the pinion, the teeth of the ratchet 35 sliding by the pawls 34. For so turning the shaft I provide a hand-wheel 36 on the end of the shaft opposite to the crank-pin 31.

Referring to Fig. 1, 37 designates a tubular standard at the front of the machine, at the top of which is secured, by suitable screw-bolts 38, the work-support 39. This work-support consists of a block provided with a flat surface and somewhat smaller than the smallest article to be cut out. Rociprocating vertically through holes in the work-support are slides 40, notched at their upper ends to form clamping projections. These slides are arranged to pass through holes punched in the sheet of material placed upon the work-support 39 and to move vertically and laterally to bring the clamping projections in contact with the material and firmly clamp the same upon the support. For moving the slides laterally they are provided at their upper ends with rounded shoulders 41, which as the slides are lowered engage the upper edges of the openings in the support and force the slides sidewise, and for reciprocating the slides they are pivotally connected at their lower ends to links 42, pivoted to a cross-rod 43, connecting the lower ends of the links. The cross-rod is held in its upper position by means of springs 44, connecting at one end with the rod and at the other end with the standard 37. The cross-rod 43 is also connected, by means of a spring 45, with a short arm 46, pivoted to the standard 37 and connected, by means of an adjustable link 47, to a treadle 48. By means of the yielding connection formed by the spring 45 the clamping-slides 40 are yieldingly actuated from the treadle 48. The treadle is held in its raised position by means of a spring 49, connecting the upper arm of the treadle to the frame of the machine. Suitable locking devices (herein shown as a spring-actuated friction-pawl pivoted to the treadle 48 and a friction-surface on the standard 37 coöperating therewith) are also provided. The holes in the support 39 for the clamping-slides 40 may be provided with bushings, as shown in Fig. 2, and the upper ends of these bushings may extend above the support to form guide-pins for entering the holes punched in the material to facilitate the placing of the sheet of material in proper position on the support. If desired, however, the guiding-pins may be integral with the support. It will be seen that by providing clamping members which extend from below through openings in the work-support and which are arranged to enter holes punched in the material placed on the support all clamping devices above the work-support or at the edge of the material are dispensed with and that therefore the cutting mechanism is free to travel completely around the work-support without interference.

The operation of the mechanism which I have illustrated as the preferred embodiment of my invention has been indicated in connection with the description of the construction of the various parts and a further description thereof is deemed unnecessary.

It is to be understood that the mechanism which I have illustrated and described embodies my invention in its preferred form only and that while the mechanism which I have disclosed is the best embodiment of my invention at present known to me my invention is not limited thereto, but may be embodied in many different constructions without departing from the spirit thereof.

Having thus described my invention, I claim as new and desire to secure by Letters Patent—

1. A machine for cutting articles from sheet material having, in combination, a reciprocating punch provided with a substantially straight cutting edge, a die coöperating therewith to support the material against the cut of the punch, and means located outside of the line of cut for movably supporting the punch and die to allow the cutting edge of the punch to be brought in line with the outline of the article to be cut out, substantially as described.

2. A machine for cutting articles from sheet material having, in combination, a reciprocating punch provided with a substantially straight cutting edge, a die coöperating therewith to support the material against the cut of the punch, a work-support, the support and punch with its die being relatively movable, and means located outside of the line of cut for movably supporting the punch and die to allow the cutting edge of the punch to be brought in line with the outline of the article being cut out, substantially as described.

3. A machine for cutting articles from sheet material having, in combination, a reciprocating punch provided with a substantially straight cutting edge, a die coöperating therewith to support the material against the cut of the punch, a work-support, the support and punch with its die being relatively movable, and means acting automatically to hold the punch and die with the cutting edge of the punch in line with the outline of the article being cut out, substantially as described.

4. A machine for cutting articles from sheet material having, in combination, a reciprocating punch provided with a substantially straight cutting edge and a die coöperating therewith to support the material against the cut of the punch traveling in a path corresponding to the outline of the article to be cut out, and means acting automatically to hold the punch and die with the cutting edge of the punch extending in the direction of travel, substantially as described.

5. A machine for cutting articles from sheet material having, in combination, a swiveling reciprocating punch provided with a substantially straight cutting edge, a die to support the material against the cut of the punch pivotally mounted concentrically with the swiveling axis of the punch and connections located outside of the line of cut to cause the punch and die to rotate in unison, substantially as described.

6. A machine for cutting articles from sheet material having, in combination, a swiveling reciprocating punch provided with a substantially straight cutting edge, a block pivotally mounted on the swiveling axis of the punch, a punch-guide and die carried by the block and a guiding-lug carried by the block arranged to enter the cut in the material back of the punch, substantially as described.

7. A machine for cutting articles from sheet material having, in combination, a swiveling reciprocating punch provided with a substantially straight cutting edge, a block pivotally mounted concentrically with the swiveling axis of the punch provided with a slot to receive the edge of a sheet of material, and a punch-guide and die carried by the block located on opposite sides of the slot, all portions of said block being outside of the line of cut, substantially as described.

8. A machine for cutting articles from sheet material having, in combination, a work-support, means for clamping a sheet of material thereon, and a reciprocating punch and die arranged to travel around said support, substantially as described.

9. A machine for cutting articles from sheet material having, in combination, a work-support, a clamping member arranged to extend above said support through a hole in a sheet of material placed thereon, means for actuating said member to clamp the material, and means for cutting an article from said material, substantially as described.

10. A machine for cutting articles from sheet material having, in combination, a work-support, a clamping member comprising a slide extending through an opening in the support, provided with a clamping projection, and means for reciprocating said slide and moving it laterally to cause the clamping projection to engage a sheet of material placed on said support, substantially as described.

11. A machine for cutting articles from sheet material having, in combination, a work-support, a clamping member comprising a slide extending through an opening in said support provided with a clamping projection, means for reciprocating said slide, and a shoulder on the slide engaging the side of the opening for moving it laterally to engage a sheet of material placed on said support, substantially as described.

12. A machine for cutting articles from sheet material, having, in combination, a reciprocating punch provided with a substantially straight cutting edge, a die coöperating therewith to support the material against the cut of the punch, the punch and die being movable to allow the cutting edge of the punch to be brought in line with the outline of the article to be cut out, and connections located outside of the line of cut to cause the punch and die to move in unison, substantially as described.

In testimony whereof I affix my signature in presence of two witnesses.

JAMES J. BREACH.

Witnesses:
ALFRED H. HILDRETH,
FRED O. FISH.